US010393563B2

(12) United States Patent
Lee et al.

(10) Patent No.: US 10,393,563 B2
(45) Date of Patent: Aug. 27, 2019

(54) VOLUMETRIC MEASUREMENT

(75) Inventors: David Charles Lee, Cheshire (GB); Martin G. Short, Cheshire (GB); Melvyn Whiteside, Cheshire (GB); Tim Redburn, Manchester (GB)

(73) Assignee: Brooks Automation, Inc., Chelmsford, MA (US)

( * ) Notice: Subject to any disclaimer, the term of this patent is extended or adjusted under 35 U.S.C. 154(b) by 1113 days.

(21) Appl. No.: 14/344,944

(22) PCT Filed: Sep. 14, 2012

(86) PCT No.: PCT/US2012/055323

§ 371 (c)(1), (2), (4) Date: Sep. 12, 2014

(87) PCT Pub. No.: WO2013/040302

PCT Pub. Date: Mar. 21, 2013

(65) Prior Publication Data

US 2015/0062332 A1 Mar. 5, 2015

Related U.S. Application Data

(60) Provisional application No. 61/534,661, filed on Sep. 14, 2011, provisional application No. 61/535,193, filed on Sep. 15, 2011.

(51) Int. Cl.

| | |
|---|---|
| ***G01F 17/00*** | (2006.01) |
| ***H04N 5/225*** | (2006.01) |
| ***H04N 5/33*** | (2006.01) |
| ***G01B 11/06*** | (2006.01) |
| ***G01F 23/292*** | (2006.01) |

(52) U.S. Cl.

CPC .......... *G01F 17/00* (2013.01); *G01B 11/0608* (2013.01); *G01F 23/292* (2013.01); *H04N 5/2256* (2013.01); *H04N 5/33* (2013.01)

(58) Field of Classification Search

CPC ... G01F 17/00; G01F 23/292; G01B 11/0608; H04N 5/2256; H04N 5/33

USPC .......................................................... 348/135

See application file for complete search history.

(56) References Cited

U.S. PATENT DOCUMENTS

| | | | |
|---|---|---|---|
| 5,365,084 | A | 11/1994 | Cochran et al. |
| 5,414,778 | A | 5/1995 | Schwartz et al. |
| 5,568,262 | A | 10/1996 | LaChapelle et al. |
| 6,061,125 | A | 5/2000 | Thomas et al. |
| 6,226,081 | B1 | 5/2001 | Fantone et al. |
| 6,424,414 | B1 | 7/2002 | Weiland et al. |

(Continued)

FOREIGN PATENT DOCUMENTS

| | | |
|---|---|---|
| EP | 0240432 | 10/1987 |
| EP | 2151690 | 2/2010 |

(Continued)

OTHER PUBLICATIONS

International Search Report, Application PCT/US2012/055323, dated Dec. 18, 2012.

*Primary Examiner* — Hee-Yong Kim

(74) *Attorney, Agent, or Firm* — Perman & Green, LLP; Colin C. Durham

(57) ABSTRACT

A volumetric measurement system having an imaging device and a light source, where the light source is configured to illuminate the container and the sample regardless of a blockage or obstruction of the sample on at least part of the container.

20 Claims, 6 Drawing Sheets

(56) References Cited

U.S. PATENT DOCUMENTS

| | | | | |
|---|---|---|---|---|
| 2003/0206650 | A1 | 11/2003 | Gladnick | |
| 2004/0142463 | A1 * | 7/2004 | Walker | A61M 1/36 435/325 |
| 2007/0107081 | A1 | 5/2007 | Cochran et al. | |
| 2010/0157100 | A1 | 6/2010 | Roquemore, III | |
| 2010/0284014 | A1 * | 11/2010 | Baba | G01N 21/474 356/446 |
| 2011/0067490 | A1 * | 3/2011 | Walsh | G01F 22/00 73/149 |

FOREIGN PATENT DOCUMENTS

| | | |
|---|---|---|
| FR | 2561228 | 9/1985 |
| JP | 2011033641 | 2/2017 |
| JP | 2010181231 | 8/2018 |

* cited by examiner

VOLUMETRIC MEASUREMENT

CROSS-REFERENCE TO RELATED APPLICATIONS

This application is the National Stage of International Application No. PCT/US2012/055323 having International Filing date, 14 Sep. 2012, which designated the United States of America, and which International application was published under PCT Article 21 (s) as WO Publication 2013/040302 A9 and which claims priority from, and benefit of U.S. Provisional Application No. 61/534,661 filed on 14 Sep. 2011 and U.S. Provisional Application No. 61/535,193 filed on 15 Sep. 2011, the disclosures of which are incorporated herein by reference in their entireties.

BACKGROUND

Field

The exemplary embodiments generally relate to liquid handling systems and, more particularly, to the calculation of sample volumes within sample tubes within the liquid handling systems.

Brief Description of Related Developments

In systems which process quantities of liquid samples, e.g. blood samples, other biological samples or chemical samples, robotically operated liquid handling systems are commonly used to transfer samples from one container to another. These samples can also be stored by the thousands or even millions of individual samples in automated storage systems. It is useful for the operator of either the liquid handling system or storage system to have an indication of the amount of sample stored in a particular tube so that as quantities of the sample are removed over time, an ongoing check can be kept on the volume still available.

Individual sample tubes are typically configured to have a maximum volume of a few milliliters, with typical volumes being 0.3 ml, 0.75 ml, 1.4 ml and 2 ml (it is noted that volumes of vacutainers are generally higher such as about 6 ml to about 10 ml). A given quantity of tubes is normally stored in a rack which can hold a certain quantity of tubes, e.g. 96 tubes. One storage system can comprise a variety of different tube and rack sizes.

One solution to the problem of assessing volume involves the manual inspection of a particular tube to assess the volume remaining, and this may be supplemented by an estimate from a user. Obviously such a solution is very labor intensive and may not be used when a great quantity of tubes requires verification.

Other, more automated, solutions exist. One of these involves the accurate weighing of a tube, which can give the weight of the sample once the nominal weight of the empty tube is subtracted therefrom. However, this can be a time consuming task and requires individual tubes to be assessed separately.

There are devices available which aim to expedite this process. One such device processes a rack of tubes by selecting a particular tube, reading its identifying bar code and then weighing it. The resulting data is then stored in a file which can be reconciled with the inventory of the entire stock of tubes. Such devices can also be used to pre-weigh the tubes so that the later weight calculation is relatively easy to do. However, this further complicates the inventory system. Also, such devices tend to be quite slow in operation and can take between 20 and 30 minutes to individually weigh a rack consisting of 96 tubes. Furthermore, if individual tubes are not pre-weighed there is a question about how accurate the subsequent volume estimating can be given that there is a noticeable difference in the weight of individual tubes and it has been seen that these can vary by as much as 20 mg.

An alternative approach to using weight to infer a volume in a tube is to utilize a non-contact liquid level detection. This approach uses one or more sensors which are operable to determine the distance between the sensor and the surface of the liquid in a tube. By use of a suitably known tube, the level of the liquid may be used to determine the volume of sample in the tube. An advantage of such a sensor is that it is able to operate at a higher speed than the weighing solution discussed previously. However, a particular shortcoming of such a device is that the tube cap or septa must be removed in order for the upper level of the liquid to be exposed. In addition to increasing the risk of sample cross contamination, this step has major implications for sample quality, unless it is performed in a controlled environment, e.g. a low humidity environment, to prevent the uptake of moisture, which could, of course, upset the volume calculations.

There are also detection systems that utilize imagers for determining the volume in, for example, a tube. These imaging systems utilize a light or laser that is projected through the sides of the tube to allow for the determination of the volume in the tube. However, if there is a label or other identifying indicia affixed to the side of the tube, the determination of the volume within the tube using these imaging systems may not be possible or may be unreliable due to, for example, the identifying indicia blocking the light or laser that is projected through the side of the tube (i.e. a clear line of sight does not exist through the tube).

It would be advantageous to have a sample tube volume measuring system that allows for a relatively high speed calculation of a sample volume within a plurality of tubes while minimizing the risk of contamination or other degradation of sample quality. It is an aim of the aspects of the disclosed embodiment to overcome the shortcomings of the prior art whether these shortcomings are set out in detail above or not.

BRIEF DESCRIPTION OF THE DRAWINGS

The foregoing aspects and other features of the disclosed embodiments are explained in the following description, taken in connection with the accompanying drawings, wherein.

DETAILED DESCRIPTION

Figure 1:
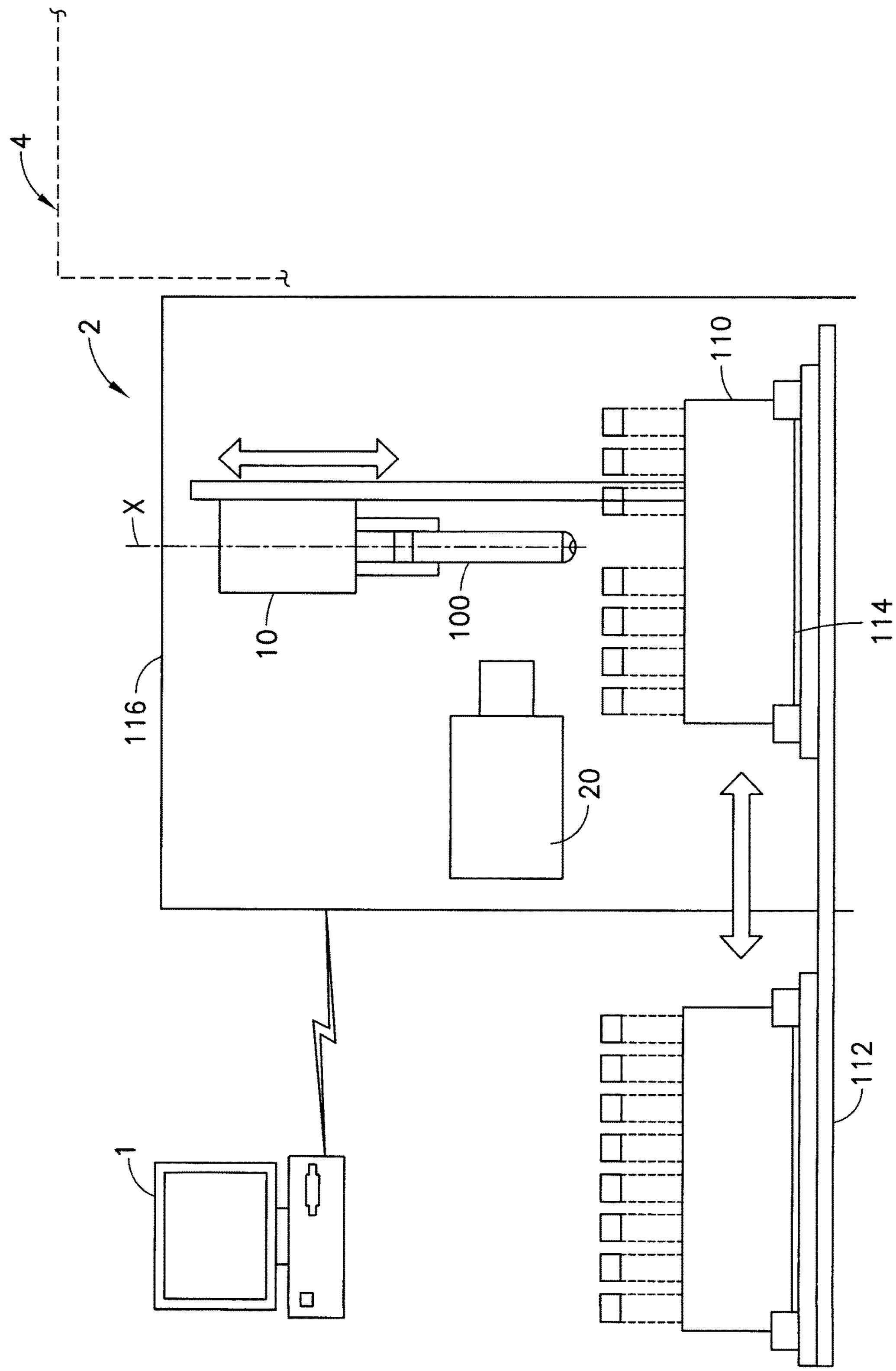
FIG. 1 is a schematic illustration of an apparatus in accordance with an aspect of the disclosed embodiment.

FIG. 1 illustrates a schematic view of a volumetric or height measurement apparatus 2 for measuring a volume or height of a sample within a container in accordance with an aspect of the disclosed embodiment. As may be realized the aspects of the disclosed embodiment described herein could be used to determine either height of the sample, volume of the sample or both the height and volume of the sample. It is noted that the determination of either the height or the volume may allow any suitable sample processing device to extract a predetermined amount of liquid from the sample. As such the determination and outputting of the height and/or volume of the sample could be a useful output of the measurement apparatus described herein. In the aspects of the disclosed embodiment the sample contained within the container may be a blood sample but it should be understood that the aspects of the disclosed embodiment may be used to measure a volume of any suitable samples contained in any suitable container. Although the aspects of the disclosed embodiment will be described with reference to the drawings, it should be understood that the aspects of the disclosed embodiment can be embodied in many alternate forms. In addition, any suitable size, shape or type of elements or materials could be used.

In one aspect, the measurement apparatus 2 may be coupled, included or otherwise connected to an automated storage system 4 capable of automatic storage and retrieval of tubes (similar to tubes 100) in racks or trays (such automatic storage systems may be referred to as biobanks). Suitable examples of automatic storage systems are described in U.S. Pat. No. 8,252,232, incorporated by reference herein in its entirety, though the automatic storage system 4 may have any suitable configuration. In another aspect the measurement apparatus may be configured as a stand-alone device. In one aspect the volumetric measurement apparatus includes a robotic gripper 10, which is operable to pick up one or more tubes 100 (e.g. vacutainers (including but not limited to EDTA, SST, ACD and PST tubes) or other suitable containers) from within a rack 110. The rack 110 comprises a plurality of tubes 100, arranged in a rectangular matrix arrangement. In other aspects the plurality of tubes may be held in the rack in any suitable arrangement or size. The rack 110 may be movable from a stowed position 112 to an accessible position 114, from which the gripper 10 can access the tubes 100. In one aspect the stowed position may be disposed in an automated storage and retrieval unit where the rack 110 is retrieved and transported to the accessible position 114 in any suitable manner such as through an automated transport (e.g. robotic grippers, conveyors, or any combination thereof). In other aspects an operator may place the rack 110 in the stowed position and effect the transfer of the rack 110 from the stowed position to the accessible position in any suitable manner such as by pushing the rack into the chamber 116 or by actuating an automated transport mechanism for transferring the rack from the stowed position to the accessible position. The accessible position may be located within a controlled environmental chamber 116. In other aspects the accessible position may be located in any suitable environment. In still another aspect, the rack could remain stationary and single tubes moved to a suitable imaging position. These tubes could also be presented manually as opposed to in an automated manner.

In another aspect of the disclosed embodiment the volumetric measurement system illustrated in FIG. 1 may be a stand-alone unit (e.g. not part of or integrated into any other apparatus, such as e.g. a storage and retrieval system). In this aspect the volumetric measurement system may be operable only to assess volumes by receiving a rack of tubes in any suitable manner, analyze each tube, and return the analyzed tubes to the rack. The rack can then be returned to its stowed location or processed as required in any suitable manner. Again, it is noted that in other aspects the tubes could be presented singly either through automation or manually for analysis.

The robotic gripper mechanism 10 may be any suitable gripper mechanism. Gripping mechanisms for sample tubes are known in the art, and no special knowledge of this device is necessary in order to comprehend the aspects of the disclosed embodiment. It is noted however that in one aspect the gripper may be configured to rotate the tube 100 held by the gripper about the longitudinal axis X as desired of the tube 100 as will be described below so that a vision system 25 can view the contents of the sample tube when there is an identifying indicia (e.g. on a label) or other material on the tube that would otherwise obstruct or distort the viewing of the contents of the tube. In other aspects the vision system may be configured to view the contents of the tube with limited or without rotation of the tube such that the obstruction on the tube does not substantially affect the ability of the vision system to view the contents of the tube (e.g. the vision system can "see" through the obstruction or image regardless of substantial obstruction). It is noted that the obstruction may be sufficient to occlude or obstruct at least one-hundred-eighty degrees or more of the tube periphery and extend in length to cover a boundary between one or more layers of a fractionated sample within the tube (see FIG. 1B).

Figure 5:
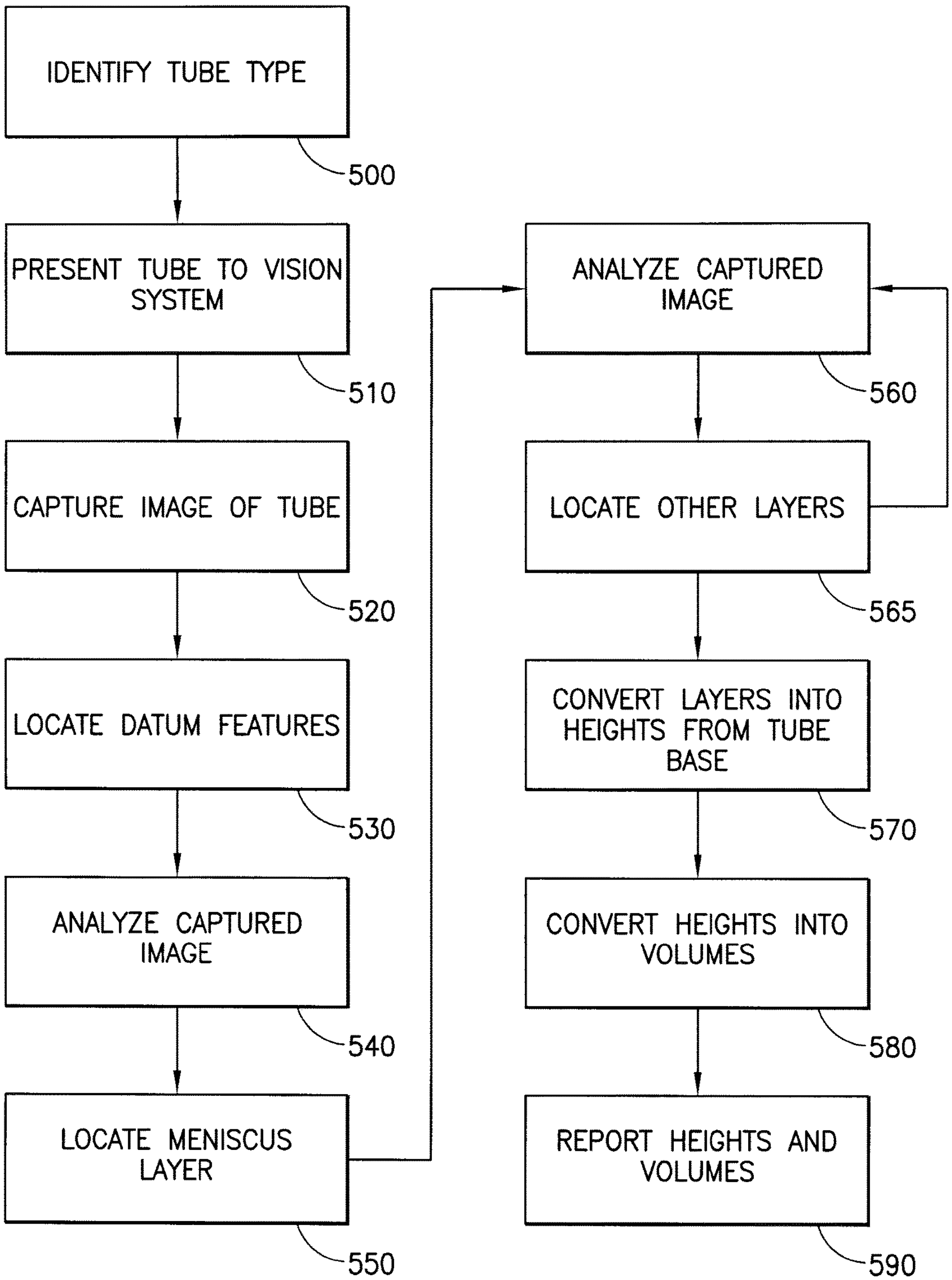
FIG. 5 is a flow diagram of a measurement process in accordance with an aspect of the disclosed embodiment.

Once a particular tube 100 is requested, the tube type (EDTA, SST, ACD, PST, etc.) is identified (FIG. 5, Block 500) and the gripper 10 is instructed to grip the desired tube and transport it to a further device, where it may be stored or processed in some way. Once the tube 100 is removed from the rack, it is momentarily suspended and presented to the vision system (FIG. 5, Block 510) so that the vision system 25 can capture an image of the tube 100 (FIG. 5, Block 520). In other aspects the tube 100 may be placed in a suitable receptacle that ensures the base of the tube is in a known datum position when it is presented to the vision system 25.

In one aspect the vision system 25 includes any suitable camera 20, a light source 30 and a reflector/diffuser 35. In other aspects the vision system 25 may include a second diffuse light source that is substantially similar to light source 30 rather than the reflector/diffuser 35, so it should be understood that wherever the reflector 35 is mentioned herein that a second light source may be used in place of the reflector 35. The camera 20 may be a color imager having any suitable resolution for capturing an image of the tube 100 with the required accuracy required for analyzing the sample, the light source 30 may be any suitable diffuse light source and the reflector 35 may be any suitable reflector for reflecting light emitted from the diffuse light source. In one aspect the light source 30 may be a white light source disposed, for example, above the camera 20 and tube 100 and the reflector 35 may be a white diffuser disposed below the camera 20 and tube 100 configured to reflect the light emitted from the light source 30 so that the diffuse lighting from above the tube 100 is reflected from below the tube 100 to substantially eliminate, for example, visually disruptive specular reflections from the tube surface. In another aspect the light source 30 may be disposed below the camera 20 and tube 100 while the reflector 35 is disposed above the camera 20 and tube 100. In other aspects the reflector may be configured to merely reflect the light from the light source 20. While the light source 30 and reflector 35 are described as having a white color in other aspects the light and reflector may have any suitable color to allow for the imaging of the tube as described herein. The light source 30 and/or reflector 35 may provide an even, diffuse illumination of the tube 100 and its contents with minimal shadowing of, for example, the meniscus (and other layers) into the sample. It is noted that while in one aspect the light source 30 and reflector 35 are shown, for example, above and below the imaged area, in other aspects different light sources and/or different reflectors/diffusers may be positioned in other suitable locations, e.g. around the imaged area (e.g. out of the field of view of the camera) to provide any desired diffused lighting to illuminate the tube and the contents of the tube in the imaged area so that the camera 20 may image the contents of the tube regardless of any obstructions and/or blockage on the tube. It is also noted that the light source and/or the reflector/diffuser may be suitably angled with respect to the tube being imaged.

In one aspect the light source 30 and the reflector 35 may be disposed between the camera 20 and the tube 100 (e.g. the light source 30 and reflector 35 are located in front of the tube) while in other aspects the light source and reflector may be disposed at any suitable position relative to the tube for illuminating the tube during imaging. It is noted that any suitable background panel 50 having any suitable color may be placed on a side of the tube opposite the camera 20 to provide better visibility of the tube 100. In one aspect the background panel 50 may have a white color.

Figure 2:
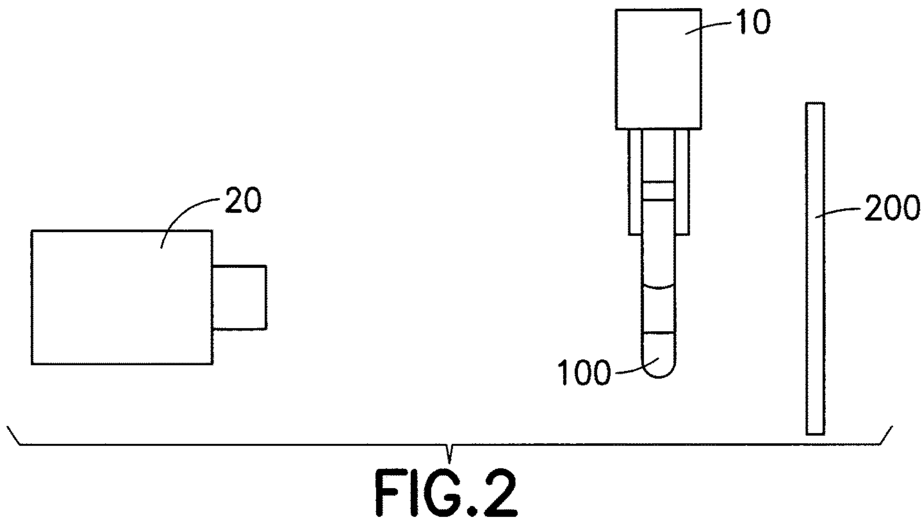
FIGS. 2-4 are schematic illustrations of a portion of the apparatus of FIG. 1 in accordance with aspects of the disclosed embodiment.

Referring to FIG. 2, in another aspect, the light source may be a backlight 200 positioned on a side of the tube 100 opposite the camera 20 (e.g. the tube 100 is disposed between the camera and the backlight). In one aspect the backlight 200 may be a backlight emitting a visible light of any suitable wavelength such as for example, a red backlight or any other suitably colored light. In another aspect the backlight 200 may be an infrared backlight. It is noted that the infrared backlight may be utilized where the tubes 100 are constructed of an opaque material or where the contents of the tubes 100 are otherwise obstructed.

Figure 3:
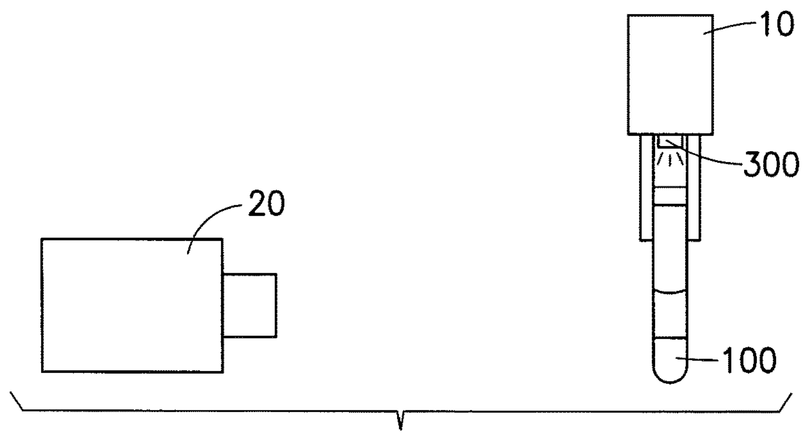

Referring to FIG. 3, in another aspect of the disclosed embodiment, the light source may be a light source 300 emitting a visible light which is located substantially above the tube 100. As may be realized if the light source is positioned directly above the tube 100 the light would be obstructed by the tube cap (if fitted). As such, in one aspect, when illuminating from directly above, the light source may be a ring shaped light placed in a position around the tube cap, such that the illumination comes from all sides of the tube. In other aspects semi-circular lights may also be used to illuminate the front and/or rear sides (relative to the camera viewpoint) of the tube. While the light source 300 is shown as being located above the tube 100 on the gripper 10 but in other aspects the light source 300 may be disposed at any suitable location above the tube 100 and it is noted that that light source 300 does not have to be disposed directly above the tube 100 but may be horizontally offset from a location of the tube 100. The light source 300 may have any suitable wavelength such as, for example, a blue colored light or any other suitably colored light. The wavelength of light source 300 may be chosen based upon light absorption by one or more substances contained with a sample tube. For example, in some embodiments, a red blood cell layer contained within a sample tube generally absorbs blue light to a greater extent than a (normally) yellow plasma layer. With a blue light, for example, red blood cells within a sample tube can appear substantially black in color and a plasma layer can appear brighter than the red blood cells while the unfilled portion of the tube is the brightest portion of the tube if, for example, there is a label or other suitable colored background, otherwise the unfilled portion may appear darker. Backgrounds such as background panel 50 may be chosen in any suitable manner to provide best contrast.

Figure 4:
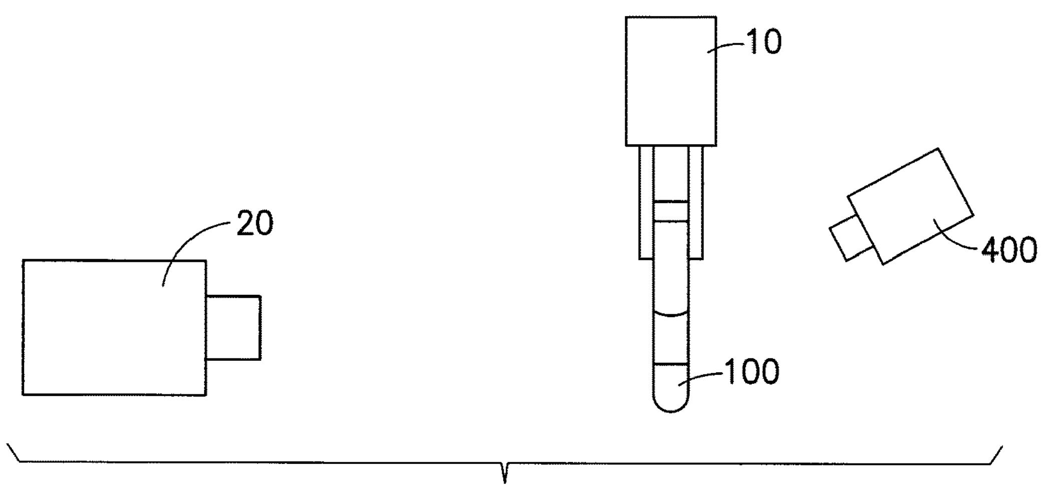

Referring to FIG. 4, in still another aspect, the light source 400 may be a laser light source that is disposed on a side of the tube opposite the camera 20 (e.g. the tube is disposed between the light source 400 and the camera 20). The light source 400 may be configured to project a laser line from an angle to the side of the tube so that the refractive properties of the layers of the sample within the tube can be seen as "steps" in an apparent line produced by the laser line. Any suitable controller, such as controller 1, may be suitably configured to determine a volume of the sample and/or the volume of each layer of the sample within the tube based on at least the steps in the apparent line in a manner substantially similar to that described herein (e.g. with reference to FIG. 5).

Figure 1B:
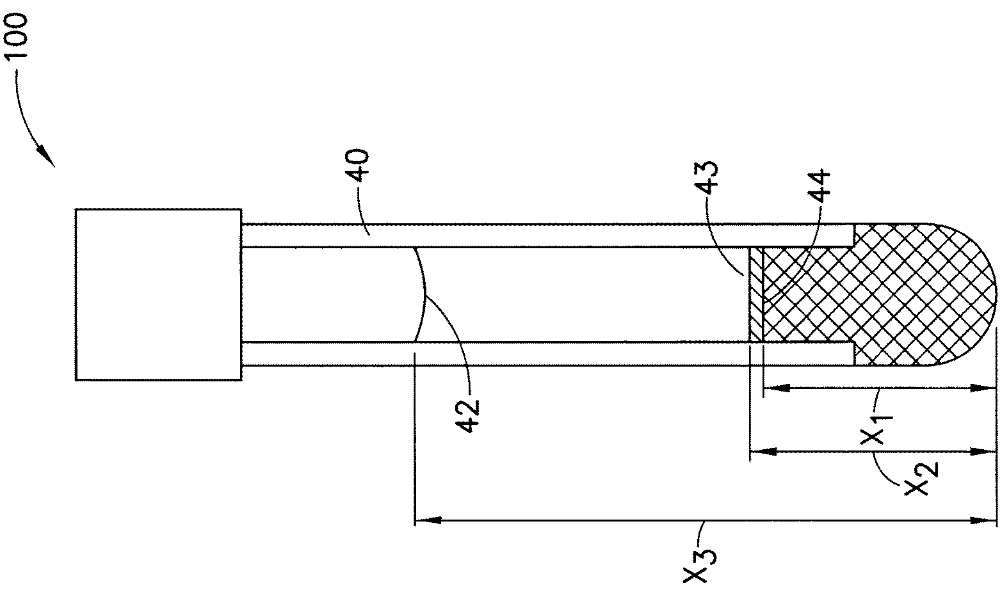
FIG. 1B is a schematic illustration of an image of a container in accordance with an aspect of the disclosed embodiment.
Figure 1A:
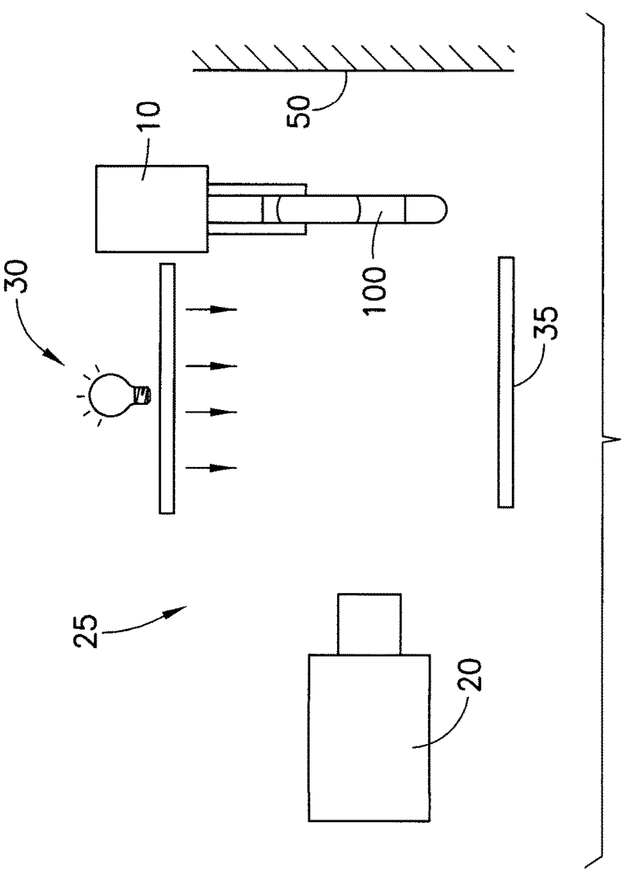
FIG. 1A is a schematic illustration of a portion of the apparatus of FIG. 1 in accordance with an aspect of the disclosed embodiment.

Referring again to, for example, FIGS. 1, 1A and 1B, the camera 20 is positioned and configured to capture an image of the tube 100, illuminated from above and below (e.g. via the light source and reflector or in any other suitable manner such as those described above with respect to FIGS. 2-4), and the gripper 10 then proceeds to process the tube 100 as requested. There is a small delay while the tube's image is captured in this way. In one aspect, where the camera's view of the contents of the tube 100 is obstructed by, for example, indicia 40 on the side surface of the tube 100 any suitable controller, such as controller 1, may be configured to cause the gripper 10 to rotate the tube so that the camera 20 has a substantially unobstructed view of the tube's contents. In other aspects the light source may be configured to penetrate the identifying indicia (or other substantially opaque obstruction) for illuminating the sample within the tube to allow detection of the sample within the tube 100.

Figure 1C:
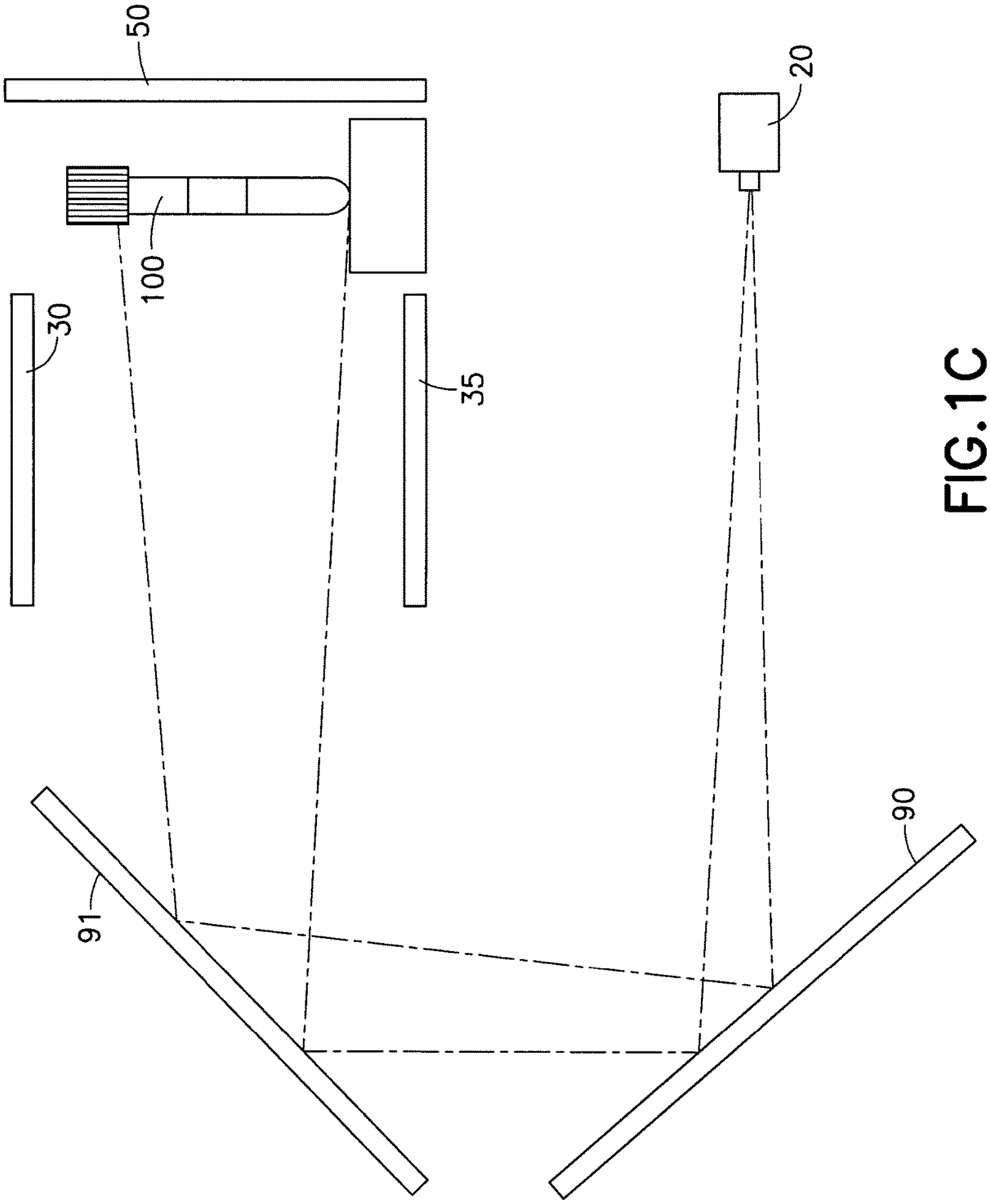
FIG. 1C is a schematic illustration of a portion of the apparatus of FIG. 1 in accordance with an aspect of the disclosed embodiment.

The distance between the camera 20 and the tube 100 as well as the optical characteristics of the camera 20 may be any suitable distance and optical characteristics so that low image distortion (e.g. perspective, magnification, spatial and chromatic aberration, etc.) is obtained for a given size of the volumetric measurement system, such as for example, within the spatial constraints of the chamber 116. However, in other aspects any suitable combinations of distances between the camera 20 and tube 100 as well as the optical characteristics of the camera 20 may be used depending on, for example, accuracy requirements of the volumetric measurement application. In one aspect the camera 20 may be a high-resolution 25 mm c-mount lens camera and the working distance between the camera 20 and the tube 100 may be about 600 mm. As may be realized shorter working distances may necessitate wider angle optics. While the camera 20 is shown in FIGS. 1 and 1A as having a substantially straight line of sight to the tube 100 in other aspects, as shown in FIG. 1C any suitable number of mirrors 90, 91 may be used between the camera and the tube for increasing the working distance between the camera 20 and the tube 100. For example, as shown in FIG. 1C two plane mirrors are disposed between the camera and the tube so that the image or view of the camera is turned through a substantially ninety-degree angle (each mirror is angled at substantially 45 degrees relative to a field of view of the camera) to allow for a longer working distance than that shown in, for example, FIG. 1 while retaining a smaller or the same size footprint for the vision system 25.

Any suitably programmed controller 1 such as, for example, a computer may be configured to control at least the gripper 10 and the vision system 25 and to process the captured image from the camera 20. The controller 1 can also maintain a database of tube volumes which can be updated from time to time, as required. As described above, in one aspect when the camera 20 is imaging a tube 100 the controller 1 may be configured to detect whether the camera's view of the tube's contents is obstructed or at least partially obstructed by, for example, the identifying indicia 40 and to instruct or issue control commands to the gripper 10 for rotating the tube 100 so that the camera has a substantially unobstructed or at least a partially unobstructed view of the contents of the tube. In another aspect the tube may be rotated while capturing an image with a line-scan camera/sensor so as to build up an unwrapped view of the entire circumference of the tube (e.g. the circumference of the tube is presented as a two-dimensional flat image). The camera may be activated once the gripper mechanism 10 has indicated to the controller 1 that it is holding the tube 100 stationary in the correct position. The controller is then able to cross-reference the image and the particular tube 100 in its database. In other aspects the camera may be activated at any suitable time upon receipt of any suitable control information. In another aspect the diffuse lighting from above and below the tube (or the lighting from the other lighting configurations described herein) may be configured to penetrate or otherwise pass behind the identifying indicia or other obstruction for illuminating the sample within the tube so that the sample is visible through the identifying indicia or other obstruction. In this aspect the tube does not have to be rotated and the image of the fractionated sample within the tube can be imaged by the camera 20 regardless of the identifying indicia or other obstructions position on the tube.

Figure 6:
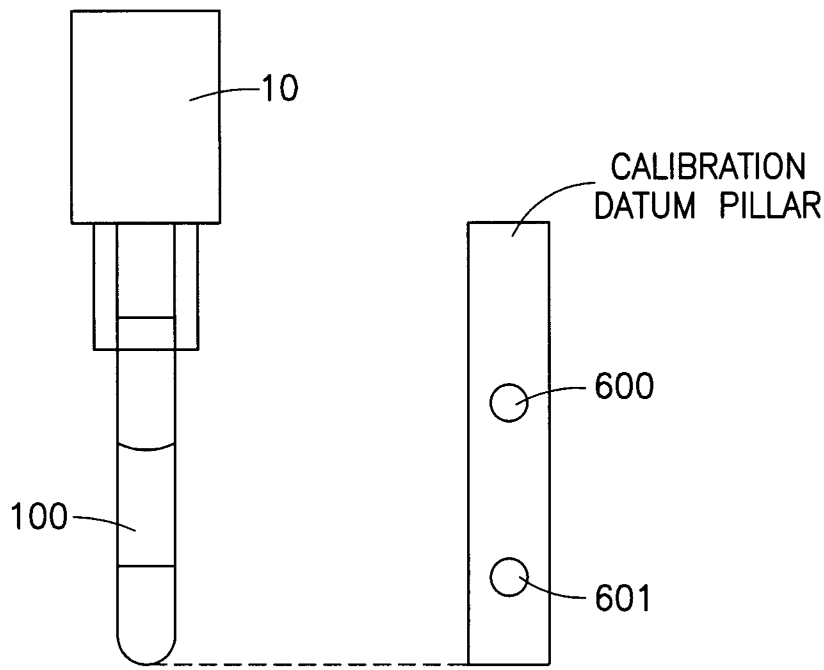
FIG. 6 is a schematic illustration of a portion of the apparatus of FIG. 1 in accordance with an aspect of the disclosed embodiment.

Once the image (see for example FIG. 1B) has been captured the image may be stored in any suitable memory such as a memory of the controller 1. As described above, the camera 20 may be a color imager and the image of the tube may accordingly be a color image of the tube. In other aspects of the disclosed embodiment the image may be a gray scale image of the tube that may be processed in a manner substantially similar to that described herein with respect to the color image. The controller 1 may be configured to locate any known datum features 600, 601 (FIG. 6) in the image (FIG. 5, Block 530). The datum features may be any suitable points or other features such as, for example, physical markers, located in the background of the imaging position. As may be realized the markers may be weighted (e.g. in size) to align with the tube so that they are presented to the camera with a similar magnification. The datum features can include crosshairs, dots or any other suitable marker which the image processing software may use to frame the resultant image and provide a calibration of the image into real units (e.g. millimeters, inches, etc.) from a known position such as the base of the tube 100. The datum features may, in one aspect, be disposed on for example, a calibration/datum pillar located adjacent the tube being imaged or other suitable structure such as on the background panel 50 as e.g. a weighted datum feature. Once the datum points are located, the position of the tube 100 can be accurately determined in relation to datum features 600, 601. As may be realized the image may be corrected for perspective if required which may be useful in case the camera 20 and/or the tube 100 are misaligned during image capture of the tube 100.

Image processing techniques may be applied by the controller 1 to analyze a color image to determine the position of the layers (e.g. meniscus layer, plasma layer, precipitate layer, etc.) (FIG. 5, Block 540). The image processing techniques may include manipulation of color space information by itself or color space manipulation in combination with other image processing techniques (such as, e.g., edge detection) in any suitable manner to, for example, enhance contrast between the layers to improve robustness of detection of the layers or other features while substantially decreasing the risk of other artifacts being erroneously detected. It is noted that color space manipulation may be applied depending on, for example, the appearance of the sample (e.g. manipulation of color space is useful for blood samples, but other types of image processing techniques may be used in lieu of or in conjunction with color space manipulation for other types of samples). In one aspect, the color space manipulation may be automatic depending on a desired manipulation protocol while in other aspects the color space manipulation may be semi-automatic with, for example, operator assistance or in yet other aspects the color space manipulation may be entirely performed by the operator if the feature being analyzed cannot be determined automatically or if the feature is selected by the operator.

It is noted that the parameters associated with the image processing using color space manipulation by itself or the color space manipulation in combination with the other image processing techniques may depend on the tube configuration (e.g. EDTA tubes, SST tubes, ACD Tubes, PST Tubes, etc.). As may be realized the configuration of the tube is known by, for example, the controller 1 in any suitable manner before the tubes are presented to the vision system so that the controller 1 can select the corresponding predetermined image processing parameters. In one aspect the controller may be configured to identify the type of tube by, for example, a marking on the tube such as the color and/or type of cap/stopper on the tube or a marking or other identifier on the identifying indicia (e.g. label) affixed to the tube or a label or other indicia on the rack 110 from which the tube is removed. In other aspects an indication of the type of tube being imaged may be provided in any suitable manner so that the image processing settings corresponding to the tube may be generated or otherwise obtained by the controller 1 for the tube type. In one aspect the image processing settings may be stored in any suitable memory accessible by the controller 1 so that as the tube type is identified in any suitable manner the controller 1 accesses the memory for obtaining the image processing settings. Suitable examples of the color manipulation settings for detecting the meniscus in, for example, an EDTA tube may be Normalize (Median 5×5(Hue-Saturation), Mean=50, Variance=255 while suitable setting for detecting the red cells in an EDTA tube may be Normalize (Median 5×5(Hue-Saturation), Mean=200, Variance=255. Suitable examples of the color manipulation settings for detecting the meniscus in, for example, a SST tube may be Median 5×5(Saturation) while suitable settings for detecting the gel separator in a SST tube may be 8×(Median 5×5(Hue-Saturation)×(inverted Intensity-Saturation)). It is noted that with the color manipulation, the layers may be detected using a normalized projection across a region of interest (e.g. an area of the tube being analyzed) and the thresholds in type (simple, first derivative, second derivative, etc.) and level depend on the tube type and layer being detected. In one aspect the color manipulation settings for the ACD and PST tubes may be any suitable settings that may be similar to those described above with respect to one or more of the EDTA and SST tubes. It is noted that the color manipulation settings described above are exemplary in nature and are provided for descriptive purposes. As may be realized, suitable variances from the values noted above are encompassed by this description.

Using the image processing techniques the meniscus layer 42 is located within the tube 100 relative to, for example, the datum features 600, 601 (FIG. 5, Block 550). Once the meniscus layer 42 has been located the image may be analyzed again using the image processing techniques, including but not limited to color space manipulation, to locate other layers 43, 44 in, for example, a fractionated sample of the tube 100 (FIG. 5, Blocks 560 and 565). As may be realized each layer is found one at a time through repeated image analysis (e.g. blocks 560 and 565 of FIG. 5 are repeated until all layers are located) but in other aspects the controller 1 may be configured to locate all of the layers with one analysis of the image.

Using the locations of the known datum features 600, 601 the controller may be configured to convert the locations of the layers 42, 43, 44 within the tube 100 to heights X1, X2, X3 from, for example, the base of the tube 100 (FIG. 5, Block 570). The controller 1 may be configured, using predetermined dimensions (e.g. internal dimensions) of the tube 100 (which may be stored in any suitable memory accessible by the controller 1) to convert the heights X1, X2, X3 into volumes in any suitable manner (FIG. 5, Block 580). For example, in one aspect to determine the volume of the meniscus layer in FIG. 1B the controller may be configured to subtract the height X2 from the height X3 and multiply the result with the cross-sectional area of the inside of the tube 100 (accounting for the curvature of the meniscus in any suitable manner). The volume of the other layers may be found in a substantially similar manner. In other aspects, look up tables may be used where each tube type/size has a respective look up table such that the controller 1 can “look up” a height and cross reference that height with a volume of the tube that has been previously calculated and saved in the table. The volumes of each layer may be obtained by subtracting the volume of one or more layers from the volume of other ones of the layers as appropriate. The controller 1 may also be configured to report the heights X1, X2, X3 and corresponding volumes to any suitable entity in any suitable manner (FIG. 5, Block 590). For example, the controller may be configured to report the heights and corresponding volumes to a liquid handler, auditing software or any other suitable program, system, processing tool, etc. that may otherwise record and store data related to the tube 100 or process the contents of the tube 100.

Figure 7:
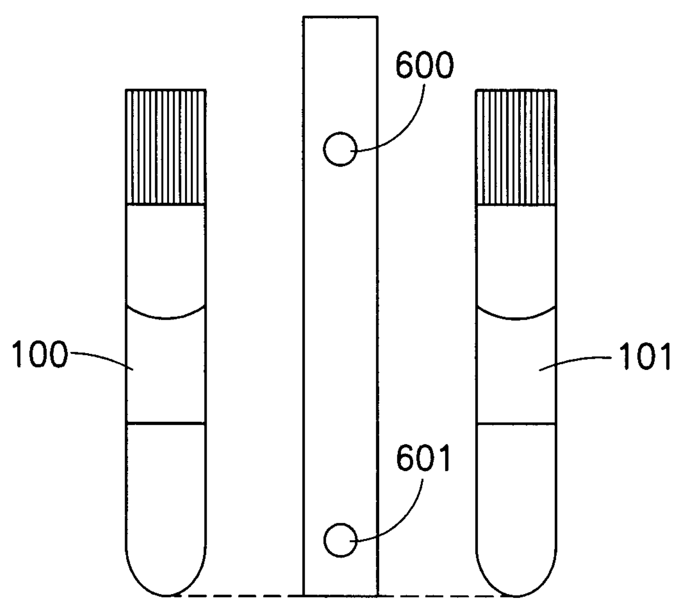
FIG. 7 is a schematic illustration of an image of multiple containers in accordance with an aspect of the disclosed embodiment.

While the aspects of the disclosed embodiment has been described with respect to only a single tube 100 it should be understood that the aspects of the disclosed embodiments may be employed to analyze more than one tube substantially simultaneously or in sequence (e.g. from left to right or right to left). For example, referring to FIG. 7, two tubes 100, 101 are illustrated from a view point of the camera 20 (e.g. the image that the camera “sees” when looking at the tubes). In one aspect each of the tubes 100, 101 being imaged may be held by a respective robotic gripper substantially similar to gripper 10 described above so that all of the tubes held by the grippers are imaged substantially simultaneously by the camera 20. In another aspect the gripper 10 may be configured to pick up an entire row or column of tubes from a rack to allow substantially simultaneous imaging of the entire row or column of tubes. In yet other aspects the tubes 100, 101 may be placed in any suitable stand, transparent rack or other support configured to allow substantially simultaneous imaging of multiple tubes. Here the controller may be configured to identify the types of tubes 100, 101 and apply image processing techniques, such as those described above, to analyze the contents of the tubes 100, 101 substantially simultaneously or in sequence.

It should be understood that the foregoing description is only illustrative of the aspects of the disclosed embodiment and that the aspects of the disclosed embodiment can be used individually or in any suitable combination thereof. Various alternatives and modifications can be devised by those skilled in the art without departing from the aspects of the disclosed embodiment. Accordingly, the aspects of the disclosed embodiment are intended to embrace all such alternatives, modifications and variances.

In one aspect of the disclosed embodiment a volumetric measurement system is provided for measuring a volume of sample in a container. The volumetric measurement system includes an imaging device and a light source, where the light source includes a diffuse light source and a reflector configured to illuminate the container and a volumetric defining feature of the sample with a diffuse light regardless of a blockage or obstruction of the sample on at least part of the container so that the volumetric defining feature is distinct in an image of the container captured by the imaging device.

In accordance with the first aspect of the disclosed embodiment the light source and reflector are positioned to illuminate the container and the sample from above and below the container.

In accordance with the first aspect of the disclosed embodiment the light source is disposed between the imaging device and the container.

In accordance with the first aspect of the disclosed embodiment the reflector is a reflective diffuser.

In accordance with the first aspect of the disclosed embodiment the imaging device is a color imaging device and the volumetric measurement system further includes a controller connected to the imaging device where the controller is configured to analyze a color image of the container captured by the imaging device In a further aspect, the controller is configured to determine a volume of a sample within the container. In still a further aspect, the sample is a fractionated sample having multiple layers and the controller is configured to determine a volume of each of the layers. In yet another aspect the controller is configured wherein the analysis of the image of the container captured by the imaging device to determine the volume of a sample in the container from an image of the multiple containers.

In accordance with the first aspect of the disclosed embodiment the volumetric measurement system further includes one or more mirrors disposed between the imaging device and the container for increasing a working distance between the imaging device and the container.

In accordance with the first aspect of the disclosed embodiment the light source is configured to supply backlight to a side of the container opposite camera side imaged by the imaging device. In a further aspect the light source is configured to supply one of visible or infrared light. In yet a further aspect the visible light is a blue or red light.

In accordance with the first aspect of the disclosed embodiment the diffuse light source emits one of substantially red light or substantially blue light.

In accordance with a second aspect of the disclosed embodiment a volumetric measurement system is provided for measuring a volume of sample in a container. The volumetric measurement system includes an imaging device and a light source, where the light source configured to provide an infrared backlight such that the imaging device is disposed to capture an image of a front side of the container and the infrared backlight provides infrared light to a back side of the container.

In accordance with the second aspect of the disclosed embodiment the volumetric measurement system is configured to effect image capture of the sample with the imaging device through an opaque container or where the sample is otherwise obscured from direct view of the imaging device.

In accordance with the second aspect of the disclosed embodiment the imaging device is a color imaging device and the volumetric measurement system further includes a controller connected to the imaging device where the controller is configured to analyze a color image of the container captured by the imaging device In still a further aspect, the sample is a fractionated sample having multiple layers and the controller is configured to determine a volume of each of the layers. In accordance with the second aspect of the disclosed embodiment the analysis of the image of the container captured by the imaging device comprises determining the volume of a sample in the container from an image of multiple containers.

In accordance with the second aspect of the disclosed embodiment the volumetric measurement system further includes one or more mirrors disposed between the imaging device and the container for increasing a working distance between the imaging device and the container.

In accordance with a third aspect of the disclosed embodiment a volumetric measurement system is provided for measuring a volume of fractionated sample in a container where the fractionated sample one or more layers. The volumetric measurement system includes an imaging device and a light source, where the light source includes a laser light source configured to project a laser line towards a side of the container such that the laser line intersects the side at an angle where the laser light is refracted and the imaging device is configured to capture refractive properties of the layers as steps in an apparent line produced by the laser line.

In accordance with the third aspect of the disclosed embodiment the imaging device is a color imaging device and the volumetric measurement system further includes a controller connected to the imaging device where the controller is configured to analyze a color image of the container captured by the imaging device using at least color manipulation of the color image. In a further aspect, the controller is configured to determine a volume of the sample within the container based on at least the steps in the apparent line. In still a further aspect, the controller is configured to determine a volume of each of the layers. In yet another aspect the controller is configured to determine the volume of a sample in multiple containers substantially simultaneously or in sequence from a single image of the multiple containers.

In accordance with the third aspect of the disclosed embodiment the volumetric measurement system further includes one or more mirrors disposed between the imaging device and the container for increasing a working distance between the imaging device and the container.

What is claimed is:

1. A volumetric measurement system for measuring a volume of a sample in a container, the volumetric measurement system comprising:

an imaging device; and a light source having a diffuse light source and a reflector configured to illuminate an interior of the container and a volumetric defining feature of the sample within the container with the diffuse light regardless of a blockage or obstruction of the volumetric defining feature of the sample, the blockage or obstruction being separate and distinct from the sample and the volumetric defining feature of the sample, and disposed on at least part of the container so that the volumetric defining feature is visibly distinct through the blockage or obstruction in an image of the container captured by the imaging device.

2. The volumetric measurement system of claim 1, wherein the diffuse light source and the reflector are positioned to illuminate the container and the sample from above and below the container.

3. The volumetric measurement system of claim 1, wherein the light source is disposed between the imaging device and the container.

4. The volumetric measurement system of claim 1, wherein the reflector is a reflective diffuser.

5. The volumetric measurement system of claim 1, wherein the imaging device is a color imaging device.

6. The volumetric measurement system of claim 1, further comprising a controller connected to the imaging device configured to analyze the image of the container captured by the imaging device.

7. The volumetric measurement system of claim 6, wherein the analysis of the image of the container captured by the imaging device comprises determining the volume of each layer of a fractionated sample having multiple layers.

8. The volumetric measurement system of claim 6, wherein the analysis of the image of the container captured by the imaging device comprises determining the volume of a sample in the container from an image of multiple containers.

9. The volumetric measurement system of claim 1, further comprising one or more mirrors disposed between the imaging device and the container configured to increase a working distance between the imaging device and the container.

10. The volumetric measurement system of claim 1, wherein the light source is configured to supply backlight to a side of the container opposite a side imaged by the imaging device.

11. The volumetric measurement system of claim 10, wherein the light source is configured to supply one of visible or infrared light.

12. The volumetric measurement system of claim 11, wherein the visible light is blue or red light.

13. The volumetric measurement system of claim 1, wherein the diffuse light source is configured to emit one of substantially red light or substantially blue light.

14. A volumetric measurement system for measuring a volume of a sample in a container within a rack holding a plurality of containers, the volumetric measurement system comprising:

an imaging device; and a light source configured to provide an infrared backlight, wherein the imaging device is disposed to capture an image of a front side of the container and the infrared backlight provides infrared light to a back side of the container so that a volumetric defining feature of the sample within the container is distinct through a blockage or obstruction, that is separate from and other than the sample, in an image of the container by the imaging device.

15. The volumetric measurement system of claim 14, wherein the system is configured to effect an image capture of the sample with the imaging device through an opaque container or where the sample is obscured from a direct view of the imaging device.

16. The volumetric measurement system of claim 14, wherein the imaging device is a color imaging device.

17. The volumetric measurement system of claim 14 further comprising a controller connected to the imaging device configured to analyze an image of the container captured by the imaging device.

18. The volumetric measurement system of claim 17, wherein the analysis of the image of the container captured by the imaging device comprises determining the volume of each layer of a fractionated sample having multiple layers.

19. The volumetric measurement system of claim 17, wherein the analysis of the image of the container captured by the imaging device comprises determining the volume of a sample in the container from an image of multiple containers.

20. The volumetric measurement system of claim 14, further comprising one or more mirrors disposed between the imaging device and the container configured to increase a working distance between the imaging device and the container.

* * * * *